United States Patent [19]
Schneider

[11] 3,809,517
[45] May 7, 1974

[54] BLOW INJECTION APPARATUS

[75] Inventor: Robert F. Schneider, Los Angeles, Calif.

[73] Assignee: Synthetic Electronic Technology Co., Inc., Los Angeles, Calif.

[22] Filed: Feb. 28, 1972

[21] Appl. No.: 229,629

[52] U.S. Cl.... 425/242 B, 425/DIG. 205, 425/DIG. 209, 425/324 B
[51] Int. Cl............................................. B29d 23/03
[58] Field of Search.......... 425/DIG. 203, DIG. 204, 425/DIG. 205, DIG. 209, 242 B, 324 B, 387 B, 326 BJ

[56] References Cited
UNITED STATES PATENTS

| | | | |
|---|---|---|---|
| 2,913,762 | 11/1959 | Knowles | 425/DIG. 209 |
| 3,160,130 | 12/1964 | Pesak | 425/DIG. 203 |
| 3,183,552 | 5/1965 | Farkas | 425/DIG. 209 |
| 3,337,910 | 8/1967 | West | 425/DIG. 203 |
| 3,390,431 | 7/1968 | Valyi | 425/DIG. 209 |
| 3,466,701 | 9/1969 | Cheney | 425/DIG. 209 |
| 3,621,523 | 11/1971 | Dicks et al | 425/DIG. 211 |

Primary Examiner—Richard B. Lazarus
Attorney, Agent, or Firm—Roger A. Marrs

[57] ABSTRACT

A blow forming apparatus is disclosed herein in which a molten plastic is forcibly injected into the shaped cavity of a closed blowing mold that is supported in a stationary location. A sleeve is movably carried on the ejector assembly of the apparatus so that its cylindrical wall divides the mold cavity into a first chamber occupied by the injected parison and a second outer chamber into which the parison is blown into the desired body shape after removal of the sleeve from the cavity. The sleeve also serves as an ejector sleeve for effecting separation of the blown body from the blowing station or mold once the formation of the body has been completed, then continues to move up into position for the next cycle.

4 Claims, 6 Drawing Figures

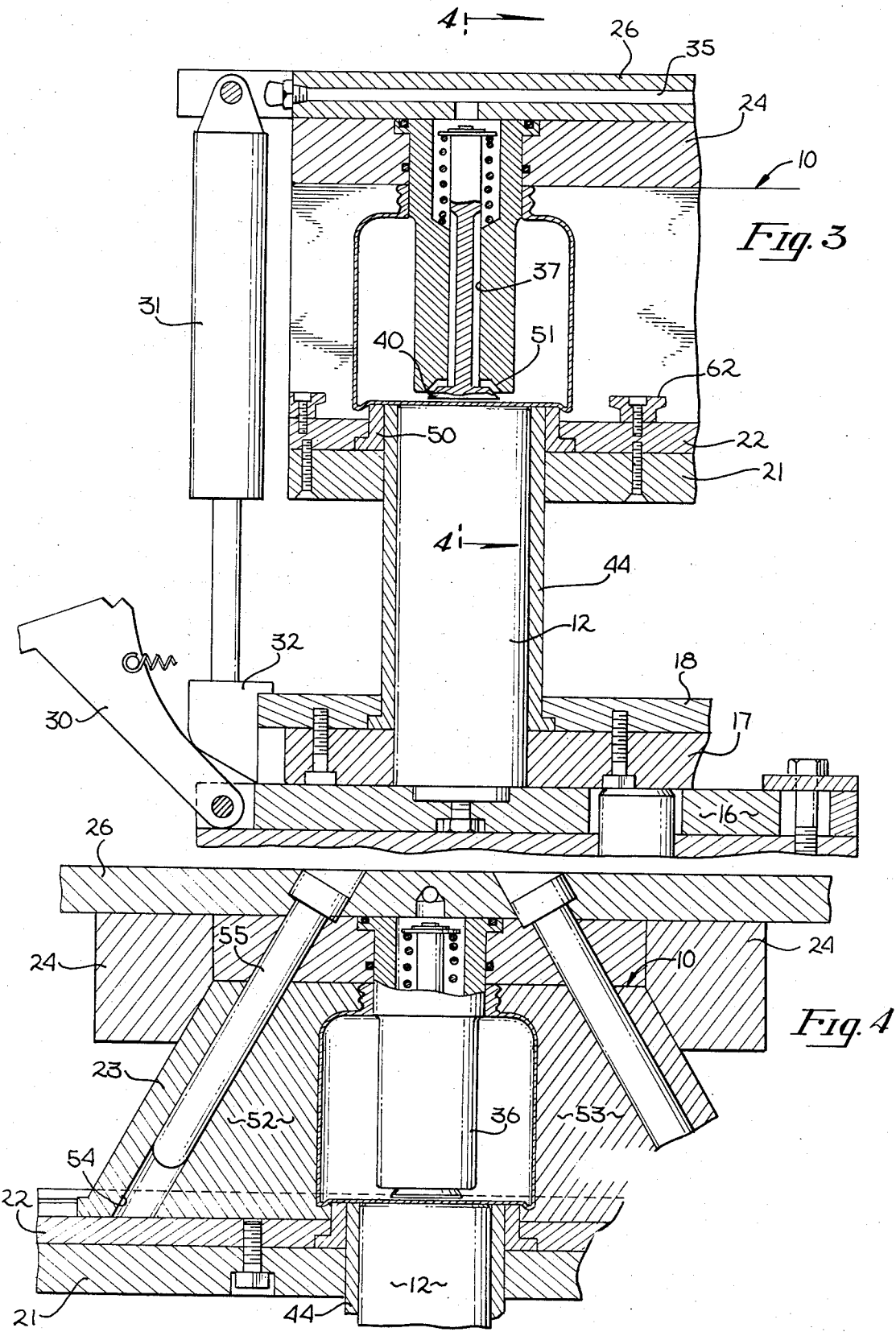

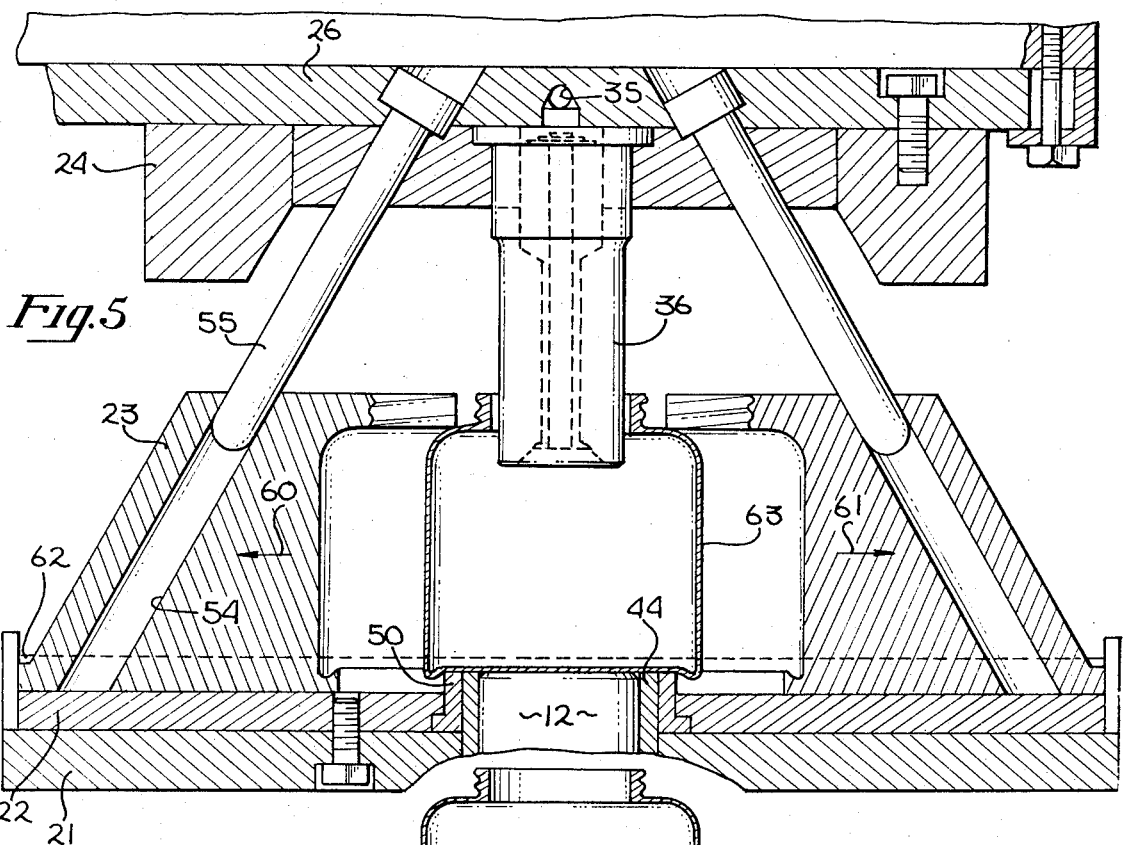
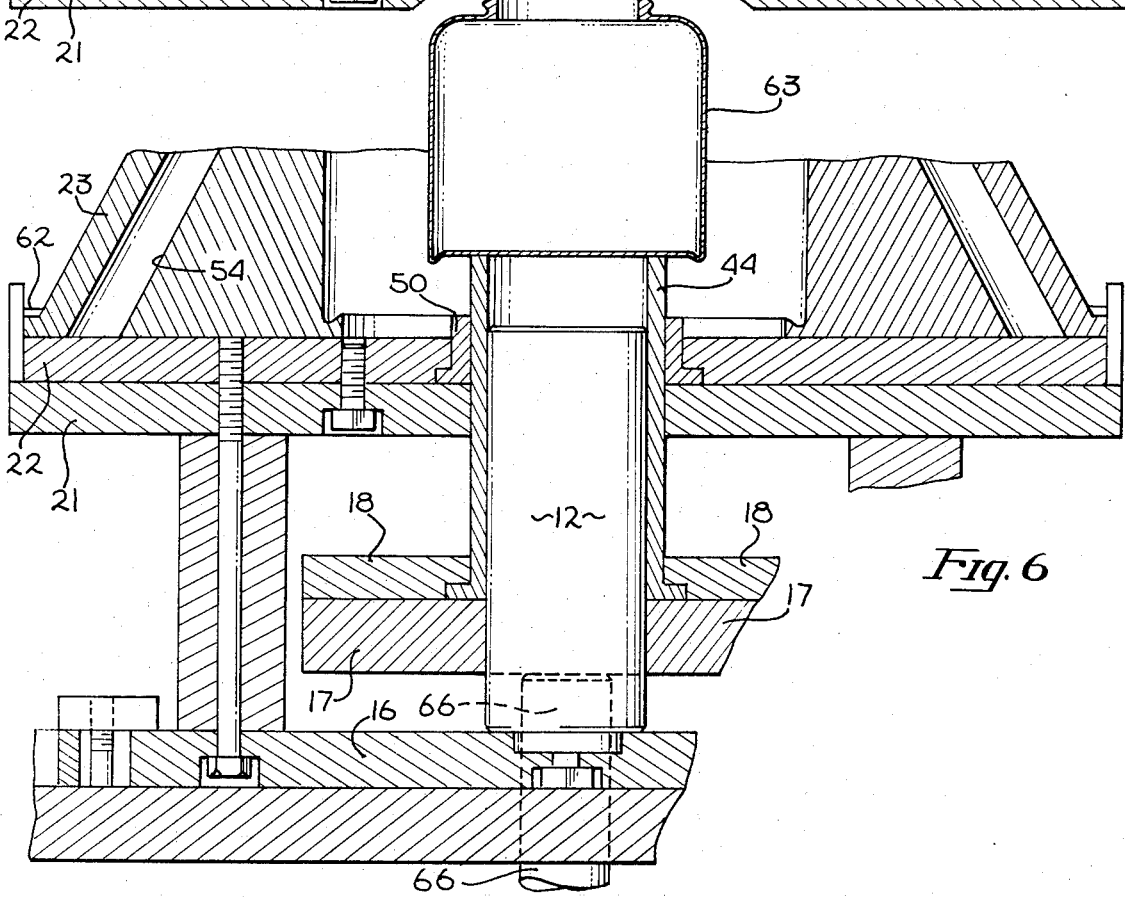

BLOW INJECTION APPARATUS

BACKGROUND OF THE INVENTION

1. Field of the Invention

This invention relates to blow injection equipment and, more particularly, to a novel apparatus for injecting the material into a confined parison mold and then altering the mold cavity so that the injected parison may be blow-formed into any desired shape of containers, such as bottles. The injection process and the blowing process takes place in the same forming station or location on the apparatus.

2. Description of the Prior Art

In blow-injection processes for forming closed-end hollow bodies from plastic materials, the conventional injection process is performed first in a closed configuration to produce the parison by transfer of the injected parison to another cavity where the blowing process is performed on the preformed parison.

In practice, parison or blow cores are slid laterally or rotated or other transfer mechanisms may be employed for moving the preformed parison from one cavity to another. Such prior equipment requires for movements or transfers of the parison being formed which necessitates an undesired consumption of time and equipment, such as transfer mechanisms. passageway Therefore, a long standing need has existed for providing a blow injection apparatus in which the injection and blowing processes are performed at a single cavity or location in the mold or apparatus.

SUMMARY OF THE INVENTION

Accordingly, a novel blow-injection apparatus is provided in which a closed mold is supported on a machine base and in which plastic material is forcibly injected into the shaped cavity thereof by a suitable high pressure mechanism. The mold includes a pair of half-sections defining the cavity and a sleeve is movably carried on the ejector unit so that its cylindrical wall separates the mold cavity into an inner chamber occupied by the injected parison and an outer chamber adapted to receive the parison during the blowing process. Means are provided for moving the sleeve cylindrical wall out of the mold cavity preparatory to the blowing procedure. The fully formed hollow body is supported on the terminating end of the sleeve after the blowing procedure so that the sleeve may be employed as an ejector for removing the formed hollow body from the mold. Also, means are operably connected to the mold half-sections for effecting closure and opening thereof to initiate and complete the forming process.

Therefore, it is among the primary objects of the present invention to provide a novel blow-forming apparatus for forming hollow bodies that does not require movement or relocation of the parison or preform from the injection molding location to the blow molding location.

Another object of the present invention is to provide a novel blow injection apparatus incorporating a single mold for injection molding a parison into a desired preform and blow molding the preform into the desired shape of the mold cavity.

Another object of the present invention is to provide a novel blow injection apparatus for forming hollow bodies in which a mold is employed having a removable partition which separates the mold cavity into a pair of coaxial chamber suitable for receiving the injected parison comprising a shaped preform and for receiving the preform during blowing for re-shaping the preform into a desired final configuration.

Still another object of the present invention is to provide a novel blow injection apparatus for mass producing hollow bodies, such as containers, at greatly reduced costs due to the elimination of preform handling or transferring mechanism.

Yet another object of the present invention is to provide a novel forming machine incorporating blow and injection molding techniques in which a multiplicity of hollow bodies may be rapidly produced whereby economics of mass production may be readily increased over conventional quantities and standards.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 3 is a view similar to the view of FIG. 2 illustrating the parison blown to the shape of the mold cavity;

FIG. 4 is a cross-sectional view of the apparatus showing the means for moving the mold half-sections as shown in FIG. 3 as taken along arrows 4—4 thereof;

FIG. 5 is a view similar to the view of FIG. 4 illustrating the final stage of opening the mold to eject the formed hollow body; and FIG. 6 is a view similar to the view of FIG. 5 illustrating the mold in full open position with the sleeve moving forward to eject the completed body.

DESCRIPTION OF THE PREFERRED EMBODIMENT

Figure 1:
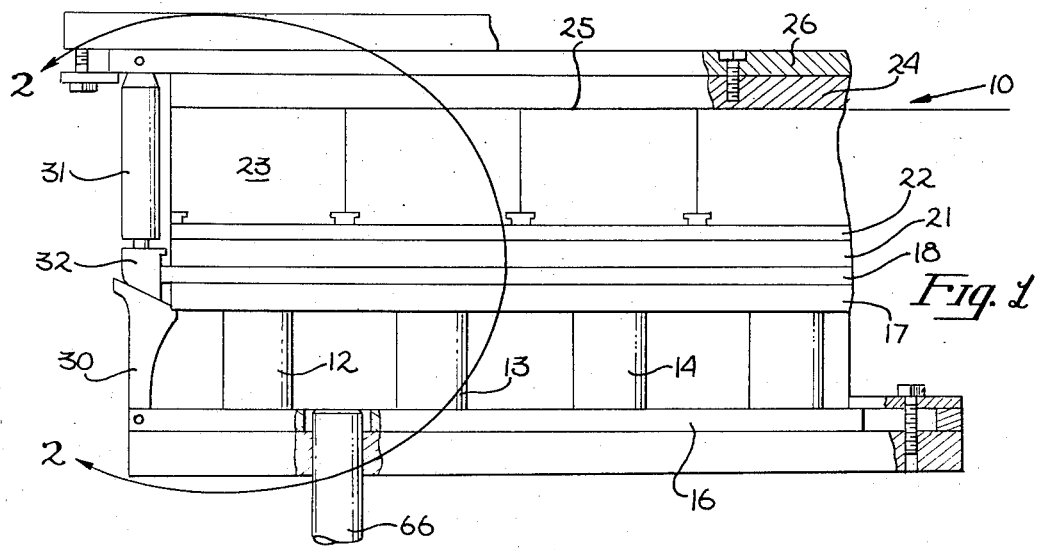
FIG. 1 is a fragmentary side elevational view of the novel blow injection apparatus of the present invention incorporating a plurality of closed molds.

In FIG. 1, a portion of a blow injection apparatus is illustrated in the direction of arrow 10 which includes a plurality of stationary guide cylinders 12–15 inclusive which are fixedly secured in spaced apart relationship on a base plate 16 that is carried on the conventional movable platen of the molding apparatus. Slidably supported on the plurality of cylinders 12–15, there is provided an ejector assembly comprising a sleeve knock-out backplate 17 and a sleeve knock-out plate 18. A parting line is indicated by numeral 20 and separation is effected when the knock-out backplate 17 carrying the knock-out plate 18 is lowered. Mated with the surface of sleeve knock-out plate 18, is a stationary core assembly comprising core backplate 21, and core retainer plate 22. Movably carried for lateral positioning on the core retainer plate is a plurality of molds, such as is indicated by numeral 23, in which each mold consists of a pair of matable half-sections having a shaped wall surface that defines an injection cavity. A cavity plate 24 rests on top of the plurality of molds 23 and a parting line 25 exists therebetween. The cavity plate 24 is stabilized by a backplate 26 which also includes ducting for introducing high pressure air into the mold cavities. Backplate 26 is secured by strap clamps to the stationary platen of the molding apparatus.

It can be seen that the baseplate or clamp plate 16 pivotally supports a clamp member identified by numeral 30. The clamp member supports the ejector assembly so that it engages with the core assembly. However, separation can occur at the parting line 20 when the clamp member 30 is pivoted outwardly. By the downward caming action of block 32, the ejector assembly is moved downwardly by means of piston and cylinder assemblage 31 which is fixedly connected at one end to the backplate 26 and fixedly connected at its piston or ram end to a cam block 32 which includes a projection engageable with the edge marginal region of the sleeve knock-out plate 18 of the ejector assembly.

Figure 2:
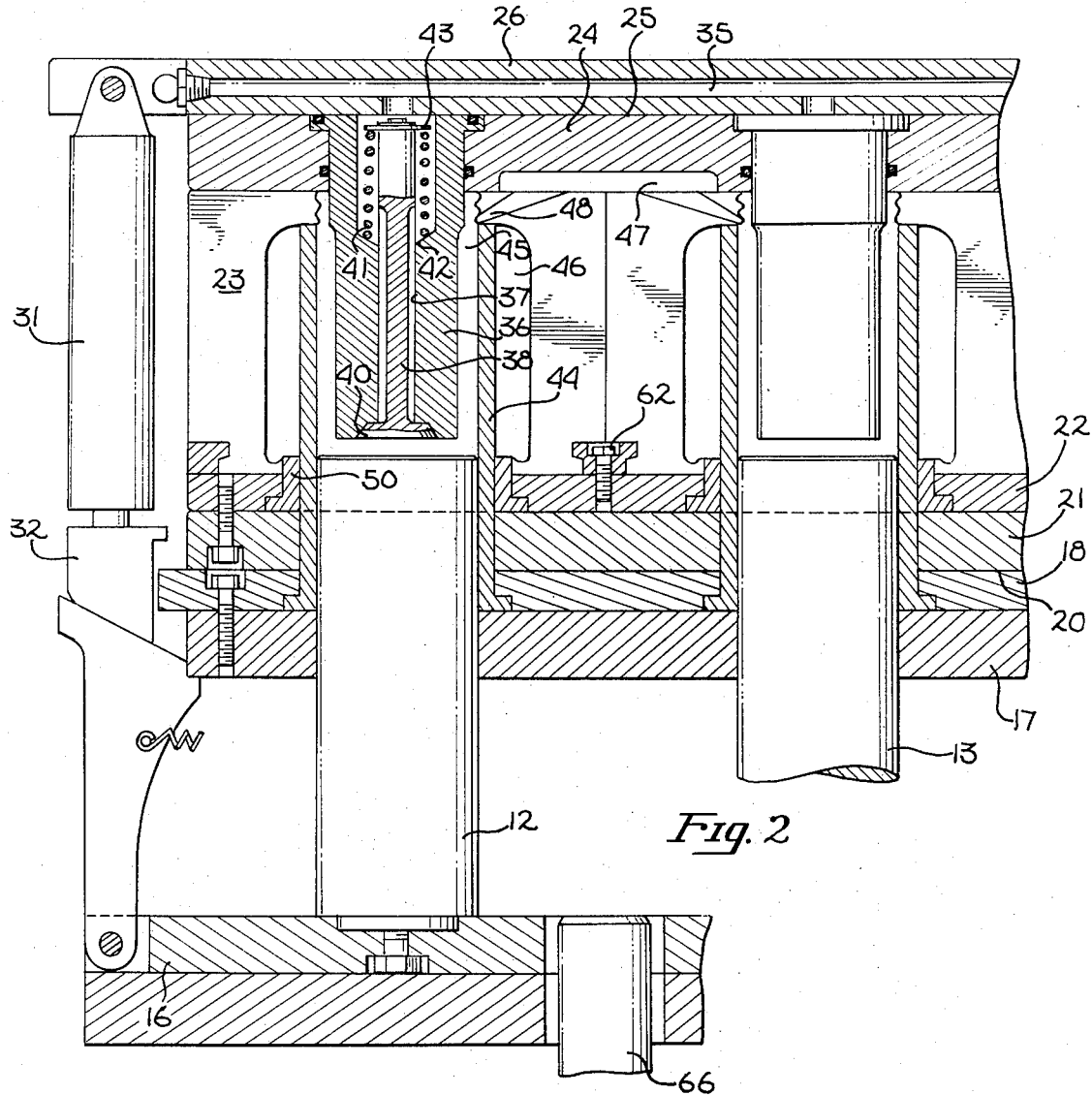
FIG. 2 is an enlarged transverse sectional view of the apparatus showing the details of the closed mold construction substantially as taken in the direction of arrows 2—2 of FIG. 1.

Referring now to FIG. 2, it can be seen that the backplate 26 includes a conduit 35 which leads to a source of high pressure air for introduction into the mold cavity ffor blowing the parison. Supported on the cavity plate 24, there is provided a plurality of main cores, such as core 36, which project downwardly into the cavity of the molds 23. The main core 36 is povided with a passageway 37 which slidably mounts a fluted stem 38 having a closure 40 at one end for selectively closing the p assageway 37 from communication with the cavity. A compression spring 41 is compressed between shoulder 42 and a screw nut 43 carried on the end of stem 38 so that the stem is normally biased to its closed condition.

It is to be particularly noted that the bottom of the main core 36 is in fixed spaced relationship with respect to the opposing surface of cylinder 12, so that the sides and bottom of the main core are exposed within the mold cavity. Furthermore, it is to be noted that an ejector sleeve 44 is carried on the ejector assembly and is movable therewith. As illustrated, the ejector sleeve includes a cylindrical wall which passes through the mold cavity in coaxial relationship with the main core 36. The end of the sleeve terminates against the upper portion of the mold surface so as to divide or separate the mold cavity into a pair of substantially coaxial chambers as identified by numeral 45 for the inner chamber and numeral 46 for the outer chamber.

Plastic material is supplied to the parison cavity under pressure by any suitable means and is introduced to the cavity from a chamber 47 via a sprue 48 in communication with the mold cavity.

The parison of plastic material is illustrated as occupying chamber 47, sprue 48 and inner chamber 45 of the mold cavity. Also, the parison is present between the opposing surfaces of the main core 36 and cylinder 12. The inside wall surface of the cylindrical portion of ejector sleeve 44 prevents the parison from entering the outer chamber 46.

With reference to FIG. 3, the second stage of hollow body or vessel production is illustrated in which the ejector assembly has been lowered by means of the piston and cylinder arrangement 31 so that the ejector sleeve 44 is withdrawn from the mold cavity in sliding relationship with the cylinder 12. The core retaining assembly continues to be stationary and its secondary core 50 remains slightly projected into the mold cavity.

It is to be noted that the terminating end of the ejector sleeve 44 is in alignment with the end of a secondary core 50. Once the sleeve has been lowered, high pressure air is introduced into the mold cavity via passageway 35, passageway 37 and past the closure 40 against the spring tension of compression spring 41. The application of the high pressure air to the closure 40 causes an annular air passageway to be defined as indicated by numeral 51. Air now presses against the parison within the inner chamber 45 about the peripheral surface of the main core 36 and the opposing surface of cylinder 12 so that the parison is blown outwardly in a radial fashion into communication with the shaped wall surface of the mold cavity. As illustrated, the blowing process is completed with the parison being forcibly urged by the high pressure to assume the shape of the mold defining surface.

As shown in FIG. 4, means are provided for opening and closing the mold wherein the mold comprises half-sections 52 and 53. Each section is formed with an elongated passageway 54 which slidably mounts a guide member 55. The passageways 54 are angularly disposed with respect to a vertical plane and as shown in FIG. 4, the mold half-sections 52 and 53 are together and the guides 55 substantially occupy the passageways 54. Also, it is to be noted that the pins 55 are carried by the stationary backplate 26 and cavity plate 24. Therefore, as the movable platen of the machine moves the base plate 16 towards and away from the backplate 26, the mold halves 52 and 53 will be urged together and apart respectively. FIG. 4 shows the mold halves together when the base plate 16 has been moved towards the backplate 26 while FIG. 5 illustrates the opening or separation of the mold halves in the direction of arrows 60 and 61 when the base plate moves away from the backplate. The mold halves will move on guides or ways 62 on the surface of core retaining plate 22. Also, as shown in FIG. 5, when the base plate 16 is moved away from the backplate 26, the main core 36 is removed from the mold area so that the completed or finished article or hollow body, as indicated by numeral 63, is fully exposed and supported on the aligned terminating ends of secondary core 50 and sleeve 44.

In FIG. 6, the conventional knock-out bar 66 has been actuated to move through the backplate into engagement with plate 17 so that the sleeve 44 assembly starts to move through core sleeve 50 and core assembly plates 21 and 22. As the sleeve 44 is raised upwardly on its way to its return position as seen in FIG. 2, the article 63 may be readily ejected or removed from the forming station somewhere along its return travel and may be removed by a subsequent jet of air or other means. Once the end product 53 hs been removed, the machine or apparatus is ready for production of another article or vessel. Initiation is effected by closing the mold halves to form a closed mold about the central core 36 and with the sleeve 44 in its uppermost position into the mold cavity as shown in FIG. 2.

Therefore, it can be seen that the apparatus of the present invention provides a novel machine for mass producing hollow bodies employing both injection and blow molding techniques. The article or vessel is produced in the same location employing these two techniques without the necessity of transferring or moving preformed or partially formed articles from one place to another to complete the process.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a blow forming apparatus for producing a single walled article in situ at a forming station on said apparatus, the combination comprising:

a molding having a shaped cavity corresponding to the shape of said article and having coaxial openings provided at the opposite ends thereof;

a sleeve movably carried on said apparatus so as to project through one of said mold openings in a first position to divide said cavity into an inner chamber and an outer chamber and so as to extend out of said cavity to close said one mold opening in a second position;

core means projecting through said other mold opening into said inner chamber;

means carried on said apparatus including a passageway provided in said mold terminating at one end in an orifice in fluid communication with said cavity for introducing plastic material under pressure so as to occupy said inner chamber to form a parison between the opposing wall surfaces of said core means and said sleeve when said sleeve is in its first position;

pneumatic means carried by said core means for introducing pressurized air into said inner chamber to expand said parison through said second chamber when said sleeve is in its second position;

an ejector assembly selectively movable towards and away from said mold;

said sleeve being fixed on said ejector assembly;

said mold has a pair of matable halves;

means carried on said apparatus for selectively separating said mold halves to permit ejection of said shaped article;

means carried on said apparatus for selectively withdrawing said core means from said mold cavity simultaneously with said mold halves separation;

said apparatus includes a member on which said sleeve slides and said member having a flat surface on one end defining the bottom of said mold cavity in spaced relationship to the end of said core means;

said sleeve moves about said member to separate said shaped article from said member flat surface in response to movement of said ejector assembly; and said means for separating said mold halves includes vertically obtuse bores formed in each mold half and rods carried on a movable platen, said mold being supported on said movable platen wherein said mold halves separate in response to a cam action between said rods and said bores as said movable platen moves.

2. The invention as defined in claim 1 wherein movement of said movable platen is linear and this movement is translated into angular movement of said mold halves via said rods and bores cooperating together in said camming action.

3. The invention as defined in claim 1 wherein said apparatus includes means for releasably clamping said sleeve into abutment with said mold preparatory to the introduction of said plastic material into said inner chamber.

4. The invention as defined in claim 1 wherein said core means includes a shaped exterior surface for directing the flow injected plastic material therearound in said inner chamber.

* * * * *